United States Patent [19]

Udagawa et al.

[11] 4,192,986
[45] Mar. 11, 1980

[54] METHOD AND APPARATUS FOR AUTOMATIC WELD LINE TRACING

[75] Inventors: Tsugio Udagawa, Tomobemachi; Takeshi Araya, Shimoinayoshi; Takashi Yoshida, Minorimachi, all of Japan

[73] Assignees: Hitachi, Ltd.; Hitachi Seiko, Ltd., both of Japan

[21] Appl. No.: 823,196

[22] Filed: Aug. 9, 1977

[30] Foreign Application Priority Data

Aug. 18, 1976 [JP] Japan .................................. 51/97718

[51] Int. Cl.$^2$ .............................................. B23K 9/12
[52] U.S. Cl. ........................... 219/137 R; 219/124.34; 228/9; 318/576
[58] Field of Search ........... 219/124.1, 124.22, 124.34, 219/137 R; 228/9, 45; 318/576

[56] References Cited

U.S. PATENT DOCUMENTS

| | | | |
|---|---|---|---|
| 3,268,805 | 8/1966 | Normando | 219/124.34 |
| 3,346,807 | 10/1967 | Wood et al. | 219/124.34 |
| 3,430,134 | 2/1969 | Flaherty et al. | 219/124.34 |
| 3,484,667 | 12/1969 | Wofsey | 219/124.34 |
| 4,015,101 | 3/1977 | Hannappel et al. | 219/124.34 |

Primary Examiner—Bruce A. Reynolds
Assistant Examiner—Clifford C. Shaw
Attorney, Agent, or Firm—Craig and Antonelli

[57] ABSTRACT

A method and apparatus for automatic weld line tracing using a non-contact sensor for detection of a weld line, which sensor is continuously reciprocated across the groove. Signals produced from the sensor during the reciprocation are compared at the ends of the groove, and the lower voltage value of the two signals is determined. A value lower than the lower voltage of the two signals by δ is predetermined and the position associated with the value is detected by a displacement-measuring instrument, the output of which is utilized for control of the positions of a welding torch.

8 Claims, 9 Drawing Figures

METHOD AND APPARATUS FOR AUTOMATIC WELD LINE TRACING

BACKGROUND OF THE INVENTION

1. Field of the Invention

This invention relates to a method and apparatus for automatic weld line tracing whereby a weld arc is accurately traced along a weld line with a groove by detecting the weld line by means of a non-contact type sensor.

2. Description of the Prior Art

A conventional automatic weld line tracing apparatus is shown in FIG. 1. In this drawing, reference numerals 1, 1' show base metals with a groove 2. Numeral 3 shows a welding torch, and numeral 4 a sensor. Both the welding torch 3 and the sensor 4 are mounted on a lateral carriage 5, which is mounted on a vertical carriage 6, which in turn is supported on a manipulator 7. Numeral 8 shows a control device, whereby the welding torch traces the groove 2 in response to the detection signal of the sensor 4.

This type of automatic weld line tracing apparatus has the problem of low tracing accuracy. For one thing, if the apparatus involves a contact-type sensor, it is largely affected by the conditions of the base metal surfaces in contact with the sensor, and the tracing operation greatly depends on tack weld or spattering. Further, the fact that the part of the sensor in contact with the base metals comprises a steel ball or roller poses the problem of lack of smooth mechanical motion sufficient for high tracing accuracy.

Non-contact types of sensor include those using electricity, magnetism or optics. All of them involve a large size of sensor and are of no practical use. Arc light, heat, fume, spatter, etc. at the time of welding operation further reduces the practicability. In addition, the torch is controlled only in lateral directions, often resulting in an error in actual tracing operation.

SUMMARY OF THE INVENTION

The object of the present invention is to provide a method and apparatus for automatic weld line tracing which automates the welding operation by causing the welding torch to trace a weld line accurately for the purpose of automatic welding along the weld line with a groove.

The automatic weld line tracing apparatus according to the present invention uses a non-contact sensor which is continuously reciprocated across the groove of the weld zone. In the course of reciprocation, an output signal from the sensor is produced in analog form in accordance with the shape of the groove. The output signals of the sensor are compared at the ends of the groove, and the lower voltage of the two signals is determined. A value lower by $\delta$ than the output voltage is predetermined, so that the position associated with such a value is detected by a displacement measuring device like a potentiometer. The detected position is produced for positional control of the welding torch. This output may alternatively be used as a signal for general tracing operation.

The height of the sensor is corrected each time of reciprocation to eliminate a detection error which otherwise might occur due to a change in height. A set of carriage bases for this positional correction in lateral and vertical directions is used. The predetermined value compared with the detection signal is not limited to the one lower by $\delta$ than the lower of the compared voltages at the ends of the groove, but the position associated with the lowest value of output signal may be detected and used. As a further alternative, an error between a predetermined tracing position and an actual tracing position may be displayed on such means as a display lamp or meter.

DESCRIPTION OF THE PREFERRED EMBODIMENTS

Figure 1:
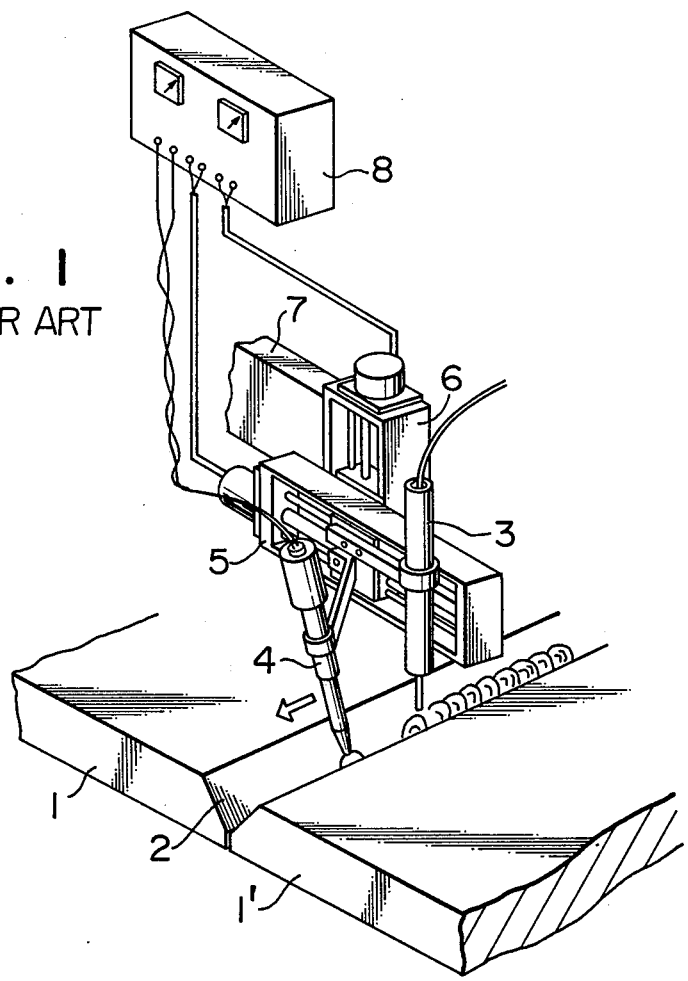
FIG. 1 is an outside view of a conventional weld line tracing apparatus of contact type.
Figure 2:
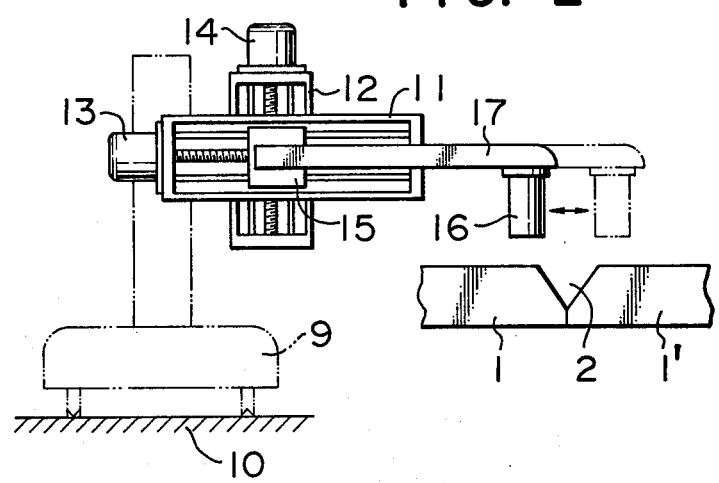
FIG. 2 is a diagram showing a drive section of an automatic weld line tracing apparatus according to the present invention.

Mechanical parts of an embodiment of the present invention are shown in FIG. 2. Reference numeral 9 shows a main carriage on which a lateral carriage 11 and a vertical carriage 12 are mounted. Carriage 9 is adapted to move on the rails 10 substantially in parallel to the weld line. The carriages 11 and 12 have drive motors 13 and 14 respectively on the ends thereof, which are rotated forwardly or reversely for rightward or leftward movement of the post 15 through a screw respectively. A very similar mechanism is provided for vertical feed. The lateral carriage 11 is mounted on the post for the vertical carriage 12. The post 15 is provided with a non-contact sensor 16 for groove detection through an arm 17. With the movement of the main carriage 9 along the weld line, the sensor 16 reciprocates laterally in such a manner as to cover the width of the groove 2 by repetitive forward and reverse motions of the drive motors 13 and 14. The movement of the sensor 16 is monitored by a position detector (not shown) mounted on the carriage 11. This position detector is conveniently comprised of a potentiometer but may alternatively consist of another device such as an encoder or differential transformer capable of detection of a displacement.

Figure 3:
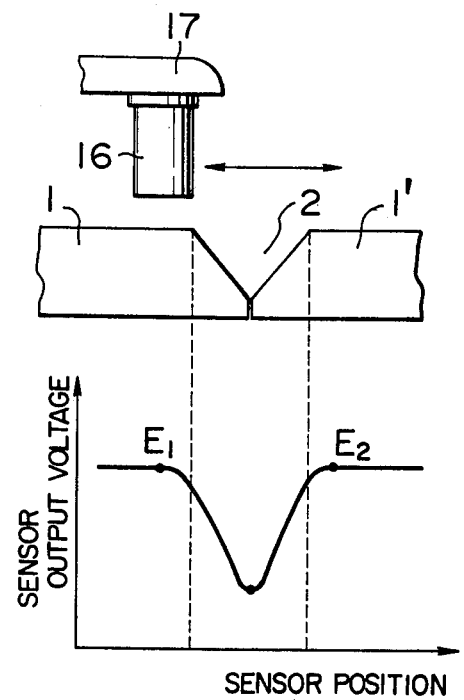
FIG. 3 shows the relation between the positions of the sensor moving across the groove and the output voltages of the sensor.

The relation between the output voltages of the sensor 16 and the groove positions is shown in FIG. 3. Assume that an output voltage $E_1$ is produced when the sensor 16 is located on the base metal 1, and an output voltage $E_2$ is generated when the sensor 16 is located on the base metal 1', over the groove 2. The output signal undergoes changes as shown in the drawing between $E_1$ and $E_2$ where the sensor 16 moves at a fixed height. The outputs change in accordance with the form of the groove. By setting an output voltage on the basis of the relation between this output and the distance covered by the sensor 16, the position on the groove associated with that particular voltage is determined. A method for tracing a weld line utilizing this idea will be explained below.

Figure 4:
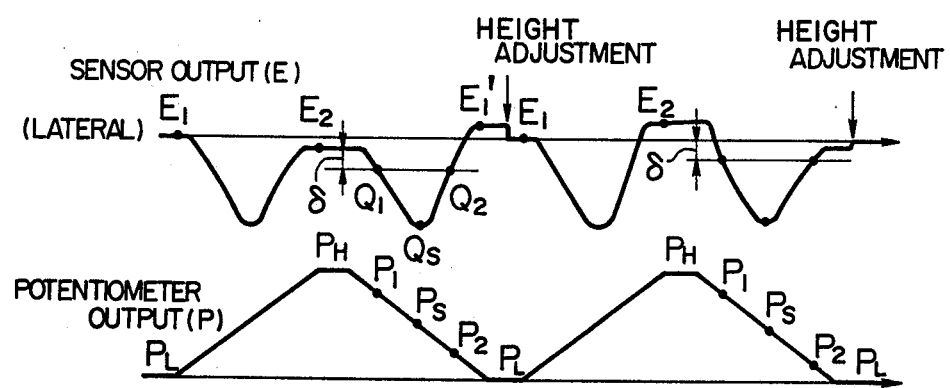
FIG. 4 is a diagram for explaining the weld line tracing operation.

A diagram for explaining the weld line tracing operation is shown in FIG. 4. The abscissa of this diagram shows the time taken to move the sensor, and it concerns the tracing of a V-shaped groove. Character E shows sensor output voltages, P an output voltage of the potentiometer for detecting lateral positions of the V-shaped groove, and Ps an output showing the central position of the groove. One reciprocation of the sensor is represented by the distance between $E_1$ and $E_2$.

Assume that the output voltages $E_1$ and $E_2$ are produced when the sensor is located on the base metal 1 and has reached the base metal 1' after crossing the groove 2. Also assume that output voltage $E_1'$ is produced when the sensor 16 crosses again the groove 2 and reaches the base metal 1. The voltages $E_1$ and $E_2$ are sampled for comparison therebetween, and the lower of the two voltages is determined. In the case of FIG. 4, the voltage $E_2$ is lower and selected, thus setting a value equal to the voltage $E_2$ less a given predetermined reference voltage $\delta$, i.e., $E_2 - \delta$ (When the sensor output voltage is reversed, the larger voltage value is selected, so that the sum of the larger value and a given predetermined reference voltage $\delta$, i.e., $E + \delta$ is set.). After this value is set, the return movement of the sensor 16 from the base metal 1' to base metal 1 begins, with the result that the sensor 16 returns to the original position. In the process of this return operation, the sensor 16 crosses the groove 2 once, and therefore there are two points at which the output voltage of $E_2 - \delta$ is produced from the sensor 16. Assume that the groove positions are $Q_1$ and $Q_2$ and the potentiometer outputs are $P_1$ and $P_2$ at such points respectively. The V-shaped groove is symmetric with respect to the weld line. By determining the average value of the outputs $P_1$ and $P_2$ ($P_s = (P_1 + P_2)/2$) corresponding to the two groove positions $Q_1$ and $Q_2$, therefore, it is possible to obtain the output of the potentiometer in the form of average Ps corresponding to the center position Qs between the groove positions $Q_1$ and $Q_2$. Thus the weld line of the V-shaped groove may be detected by the outputs of the potentiometer.

After producing Ps, the sensor is restored to the original position. In the process, if the height of the base metals 1, 1' are different from each other due to the deformation of the base metal 1, 1' or like so that the output of the sensor becomes higher (or lower) than $E_1$, the height of the sensor is raised (or lowered), in such a manner as to attain the output voltage value of $E_1$. This adjusting operation is performed so that, as described later, the output signal of the sensor 16 is switched from lateral control to vertical control. As a result, lateral and vertical control operations can be performed with one sensor. After vertical positional adjustment, lateral movement is again started for repetition of the above-described process.

The output of the potentiometer is repeated for each reciprocation of sensor 16. This signal Ps is used to correct the position of the lateral carriage of the welding torch. Further, the center position of the sensor reciprocation is predetermined. The predetermined value is compared with the actual output Ps of the potentiometer. By correction to eliminate the difference therebetween, the weld line is copied by self-correction even when the groove position changes with the progress of the main carriage 9.

Figure 5:
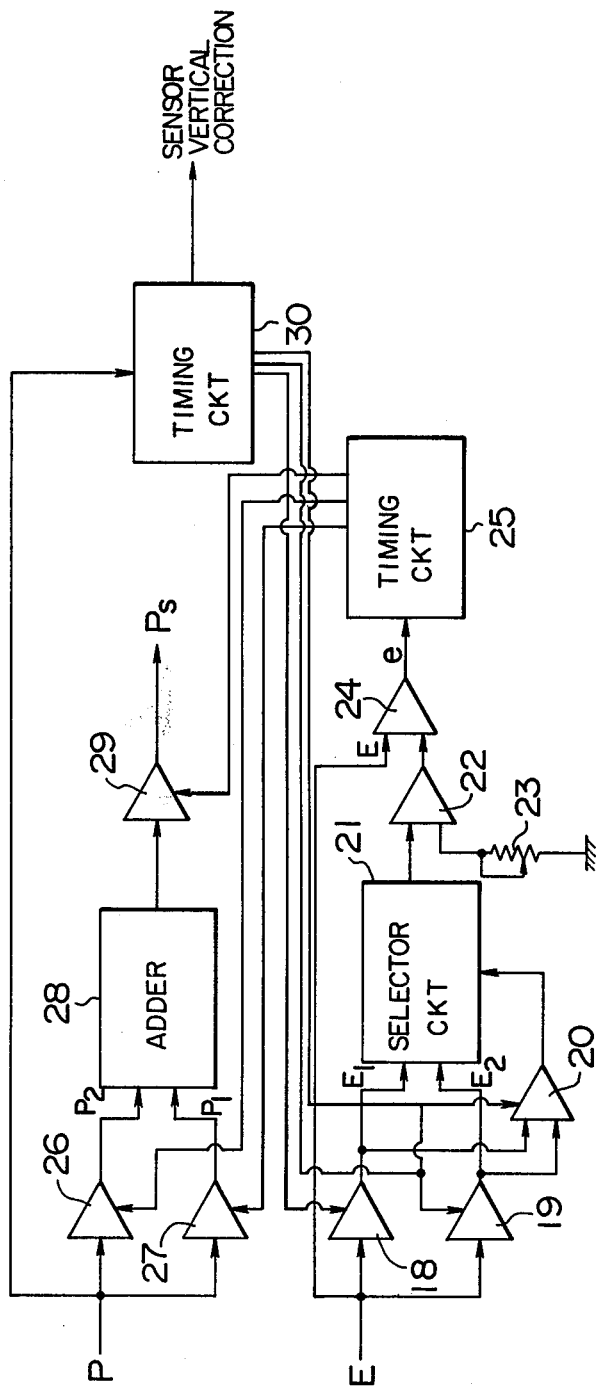
FIGS. 5 and 6 are block diagrams showing a control circuit for embodying the present invention.

A block diagram for explaining actual operation of the apparatus is shown in FIG. 5. This drawing concerns a control system of analog type of tracing operation. Reference character P shows the output of the potentiometer, and character E the output of the sensor. The sensor outputs $E_1$ and $E_2$ are held respectively at the sample-hold circuits 18 and 19, compared with each other at the comparator 20, and the smaller of the two is selected by the selector circuit 21. In such a manner as to reach a level smaller by $\delta$ than this lower value, a given level is set by the operational amplifier 22 and the level setting circuit 23. The position associated with that level is applied via the comparator 24 to the timing circuit 25 to give the timing for sample-holding the potentiometer position P by the sample-hold circuits 26 and 27 which respectively hold the values $P_1$ and $P_2$. The output values of the potentiometer $P_1$ and $P_2$ are sample-held at that timing so that the output Ps of the potentiometer corresponding to the central position is produced through the adder 28. This value is held by the sample-hold circuit 29 till the next application of a signal after one reciprocation in accordance with a timing signal from the timing circuit 30.

The sensor height is corrected by the operation of the vertical control circuit after the sensor output circuit was switched to the vertical control circuit in response to the output signal of the timing circuit 30. After vertical correction, a signal for sample-holding the output E of the sensor 16 is produced from the timing circuit 30 and applied to the sample hold circuits 18, 19 and comparator 20.

Figure 6:
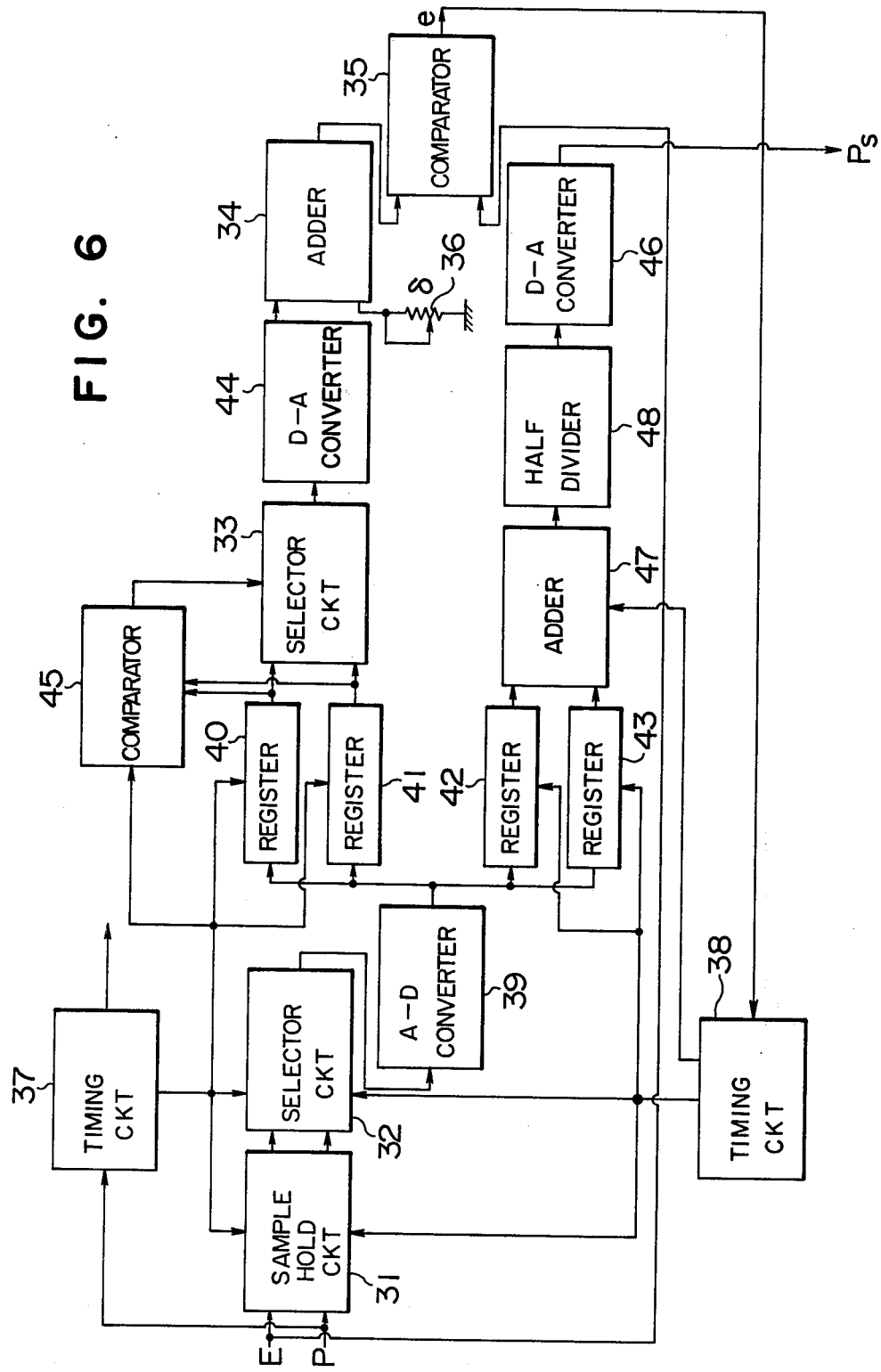

A block diagram for explaining the tracing control of digital type is shown in FIG. 6. This circuit includes an A-D converter 39, registers 40, 41, 42 and 43, D-A converters 44, 46, an adder 47, and a half divider 48 specific to digital systems, in addition to the sample hold circuit 31, the selector circuits 32 and 33, the adder 34, the comparators 35 and 45, the level setter 36, and the timing circuits 37 and 38.

The operation of this circuit will be described below. First, the sensor 16 output voltages $E_1$ and $E_2$ at end points $P_L$ and $P_H$ after movement of the sensor from $P_L$ to $P_H$ in FIG. 4 are sampled by the sample-hold circuit 31 and the analog selector circuit 32, converted into digital amounts by the A-D converter 39, and the resulting values $E_1$ and $E_2$ are stored in the registers 40 and 41. The timing circuit 37 provides proper timing for the circuits 31, 32, 40 and 41 in accordance with its input position signal P. These outputs $E_1$ and $E_2$ are compared at the comparator 45, so that the lower of the two is selected by the digital selector circuit 33 ($E_2$ if $E_1$ is larger than $E_2$; or $E_2$ if $E_2$ is larger than $E_1$), and converted into an analog signal by the D-A converter 44. A reference voltage $\delta$ of the level setting circuit 36 is added to this analog signal at the adder 34 to produce the value $E_1 - \delta$ or $E_2 - \delta$, which is compared with the output signal of the sensor 16 at the comparator 35.

When the sensor 16 moves in the direction from $P_H$ to $P_L$, the output voltage of the sensor 16 crossing the groove takes the waveform as shown in FIG. 3, with the result that the voltage value $E - \delta$ is produced at two points $P_1$ and $P_2$. These two points are detected by the comparator 35 which produces the output signal e to provide the input for the timing circuit 38. The output voltage of the potentiometer in the process is held by the sample-hold circuit 31, converted into a digital value by the selector circuits 32 and 39, and the resulting values Ep1 and Ep2 are stored in the registers 42 and 43 in accordance with timing signals produced by the timing circuit 38 in response to e. From these output values, an average, i.e., the center of the groove Ps is calculated by the adder 47 and the half divider 48. The digital value Ps is produced in the form of analog value from the D-A converter 46, thus producing a groove-correction signal.

Figure 7:
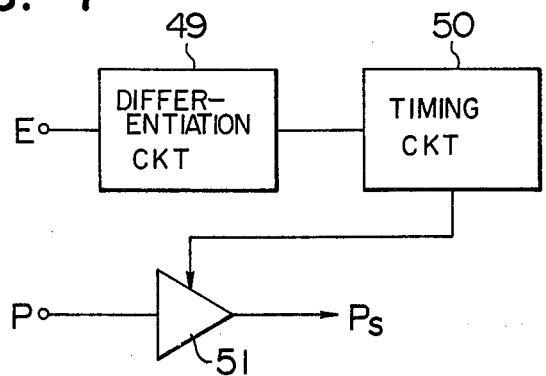
FIG. 7 is a block diagram showing a detection circuit for detecting the position associated with a minimum value of an output signal of the sensor.

Any of the above-mentioned methods may be used for tracing the weld line. All of the above-mentioned methods for tracing the weld line are ones whereby the outputs of the sensor at the base metals 1 and 1' are compared and the center of the groove is detected by calculation from the position associated with a given set level δ, thus accomplishing the correction while tracing the weld line. A block diagram of a detector circuit for detecting the position associated with the minimum value of sensor output is shown in FIG. 7. Reference numeral 49 shows a differentiation circuit, numeral 50 a timing circuit, and numeral 51 a sample-hold circuit. The sensor 16, while being moved across the welding groove, produces an output E which is applied to the differentiation circuit 49, where the differentiation coefficient varies with the output E. The differentiation coefficient undergoes change from negative to positive for one (going) way and from positive to negative for the other (return) way. At the timing of such a variation, the timing circuit 50 produces a pulse signal, and the value P of the output of the position-detecting potentiometer is held by the sample-hold circuit 51 thereby to produce the output Ps. For the tracing purpose, the difference between this output and a predetermined position is produced, and the position is corrected in such a manner as to eliminate such a difference. The positional correction of the sensor may be accomplished twice during one reciprocation.

According to the above-mentioned tracing methods, the groove position is predetermined, the difference between the predetermined value and the detected value being produced and the position of the welding torch is corrected. In this method, the actual tracing condition during the tracing operation is hard to monitor. In order to monitor the tracing condition during actual operation, therefore, display means must be provided.

Figure 8A:
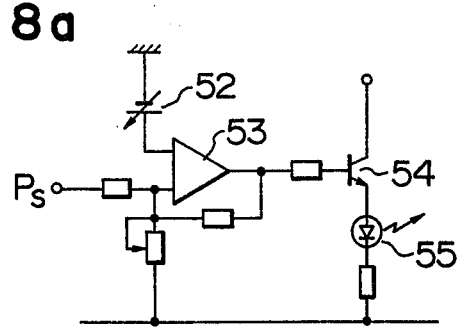
FIGS. 8a and 8b are block diagrams showing display circuits for monitoring the groove tracing position.
Figure 8B:
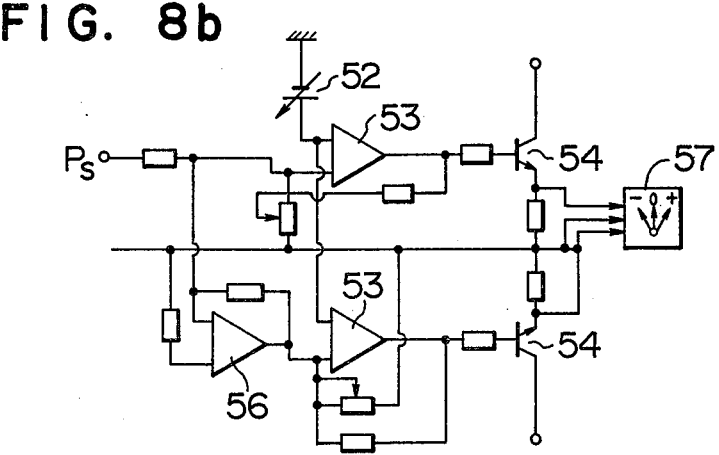

Examples having a display circuit for monitoring the groove tracing position are shown in FIGS. 8a and 8b. The former shows a method using a lamp indication, and the latter a method of meter indication. In FIG. 8a, the groove tracing position is set by the setter 52 in advance. This position is compared with the output position Ps determined by the tracing operation at the comparator 53, through which the voltage difference is used to turn on or off the transistor 54. In the case where the setting and the detected value are identical, the transistor 54 becomes almost nonconductive and the light-emitting diode 55 is lit blue. If there is any difference between the setting and the detected value, on the other hand, the transistor 54 conducts and the light-emitting diode 55 is lit red. This light-emitting diode 55 is preferably of such characteristics as to change its illumination color with voltage. In this way, displays of different colors may be accomplished with a single component part.

The circuit of FIG. 8b, based on that of FIG. 8a, additionally includes a reversing amplifier 56 in a preceding stage of the comparator. The circuit is adapted to determine whether the difference between the setting signal determined by the setter 52 and the detected signal Ps is positive or negative or identical. The result of the discrimination is used to deflect the meter 57 to positive side or negative side as the case may be, thus enabling continued monitoring of the difference therebetween.

It will be understood from the foregoing description that according to the present invention, it is not necessary to change the setting even when the shape of the base metals with a great thickness changes for each pass, thus making possible the welding operation to the final layer. Even in the case where there is a dislocation between base metals, the fact that the tracing position is detected on the basis of the lower of the sensor output voltages at the ends of the groove permits smooth welding.

Further, since the lateral and vertical lengths are detected by the sensor by switching the circuits, the present invention uses only one sensor as compared with the conventional apparatus requiring two sensors and two circuits. Thus, both the construction is simplified and the welding accuracy improved.

We claim:

1. In a method for automatic weld line tracing wherein the welding torch traces a groove formed between two base metals which are to be welded in accordance with the output voltages E of a sensor reciprocating back and forth in a contactless way over the base metals across the groove thereof, wherein the magnitude of the output voltage E varies inversely with the distance of the sensor from the base metal which the sensor is passing over, said method comprising detecting output voltages $E_1$ and $E_2$ of the sensor which are the output voltages at the respective ends of said groove each time the sensor passes over the groove, thereby indicating the distance of the sensor above each of the ends of the groove, comparing the output voltages $E_1$ and $E_2$ with each other to determine which voltage is lower, setting a voltage equal to the difference of the lower of said two voltages $E_1$ and $E_2$ and a reference voltage δ i.e., $E_1-\delta$ or $E_2-\delta$, determining an output voltage Ps equivalent to the center of said groove from said voltage value $E_1-\delta$ or $E_2-\delta$, producing the difference between said voltage Ps representing the center of said groove and a predetermined voltage representing the center of sensor reciprocation, and tracing said groove in such a manner as to eliminate said difference thereby to align the welding torch with the groove.

2. A method for automatic weld line tracing according to claim 1, in which the distance between said contactless sensor and said base metals indicated by the sensor output voltage is detected, and said distance is adjusted after each reciprocation of said sensor to equal a predetermined distance.

3. A method for automatic weld line tracing according to claim 2, wherein said predetermined distance is the distance corresponding to the sensor output voltage $E_1$.

4. In a method for automatic weld line tracing where a groove formed between two base metals which are to be welded is detected by use of a sensor reciprocating back and forth in a contactless way over the base metals across said groove, said sensor providing an output voltage whose magnitude varies inversely with the distance of the sensor from the base metal which the sensor is passing over, said method comprising differentiating the output signals to determine the position associated with the minimum value of the output signals of said sensor during each reciprocation thereof, thereby indicating the point of the groove formed between the base metal which is farthest away from the sensor, determining the difference between said position and a predetermined position, tracing said groove while making correction to eliminate said difference, and indicating the difference between the groove and a set position of said groove.

5. An automatic weld line tracing apparatus comprising a sensor reciprocating back and forth in a contactless way across a groove formed between two base metals which are to be welded, said sensor providing an output voltage E which varies inversely with the distance of the sensor from the base metal which the sensor is passing over, means for moving and controlling said sensor, and means for providing position signals indicative of the position of said sensor, wherein said moving and controlling means comprises sample hold circuits for holding the sensor output voltages $E_1$ and $E_2$ corresponding to the respective sensed voltages at the ends of the groove, a comparator for comparing the levels of said sensor outputs $E_1$ and $E_2$ with each other, a selector circuit for selecting the lower of said compared sensor outputs, a level setter capable of setting a given value $\delta$, an operational amplifier for detecing a level lower than the value set by said selector circuit by the value $\delta$ of said level setter, a comparator for comparing the sensor output E with the level detected by said operational amplifier, a timing circuit for producing a pulse signal when the sensor output coincides with the level from said operational amplifier as a result of said comparison, sample-hold circuits for holding the position signals produced from said sensor in response to said pulse signal, an adder for producing the sum of the position signals produced from said sample and hold circuits for holding said position signals, and a hold circuit for holding said sum until the application of the next signal.

6. An automatic weld line tracing apparatus according to claim 5, in which said apparatus includes a sample hold circuit 31 for holding the sensor output E and the signal P produced from the sensor position detector, a selector circuit 32 for selecting the values of said sensor outputs $E_1$, $E_2$ and position signals $P_1$, $P_2$ in response to signals produced from the timing circuits 37 and 38 respectively, an A-D converter for converting the sensor outputs $E_1$, $E_2$ and position signals $P_1$ and $P_2$ into digital values, registers 40, 41, 42 and 43 for storing said digital values respectively, a comparator 45 for comparing $E_1$ and $E_2$ with each other, a selector circuit 33 for selecting one of said voltages $E_1$ and $E_2$ in response to a signal produced from said comparator 45, a D-A converter 44 for converting said selected value into an analog value, an adder 34 for adding the value produced from said D-A converter 44 to the value produced from said level setter 36 capable of setting a given value $\delta$, a comparator 35 for comparing the sensor output E and the output of said adder 34 with each other, an adder 47 for adding the values produced from said registers 42 and 43 to each other, a divider 48 for dividing the values from said adder 47 into half for determining the center position of said groove, and a D-A converter 46 for converting said divided value into an analog value.

7. An automatic weld line tracing apparatus according to claim 5, further comprising means to adjust the distance between the sensor and the base metal after each reciprocation of the sensor to equal a predetermined distance.

8. An automatic weld line tracing apparatus according to claim 7, wherein said predetermined distance is the distance corresponding to the sensor output voltage $E_1$.

* * * * *